July 27, 1948. F. A. MULLIGAN 2,445,886
MOBILE GRAIN HOPPER

Filed Feb. 5, 1946 2 Sheets-Sheet 1

FIG I

INVENTOR:
Frederick A. Mulligan
his Atty's.

July 27, 1948.  F. A. MULLIGAN  2,445,886
MOBILE GRAIN HOPPER

Filed Feb. 5, 1946  2 Sheets-Sheet 2

INVENTOR:
Frederick A. Mulligan
Ouersonhaugh&Co
his Atty's.

Patented July 27, 1948

2,445,886

UNITED STATES PATENT OFFICE 2,445,886

MOBILE GRAIN HOPPER

Frederick A. Mulligan, Rosser, Manitoba, Canada

Application February 5, 1946, Serial No. 645,602
In Canada February 7, 1945

2 Claims. (Cl. 214—83.16)

My invention relates to a mobile grain hopper, the device so named being designed and intended for the purpose of being placed at suitable intervals along the course of a grain combine during the operation of harvesting to receive the grain of the conventional hopper with which combines are commonly provided, which may thereafter be transferred by grain-auger means into trucks or wagons for hauling to the granary.

A further object of my invention is to provide a device of the character herewithin described which may be manufactured and sold for an inconsiderable price, and which, in the smaller sizes at all events, may be manually moved around over short distances when necessary, it being intended that grain farmers will own at least two or more of these vehicles, which may be "spotted" at suitable intervals adjacent the course of a combine-harvester for the purpose set forth in the next preceding paragraph.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings, in which.

In the drawings like characters of reference indicate corresponding parts in the different figures.

Figure 1:
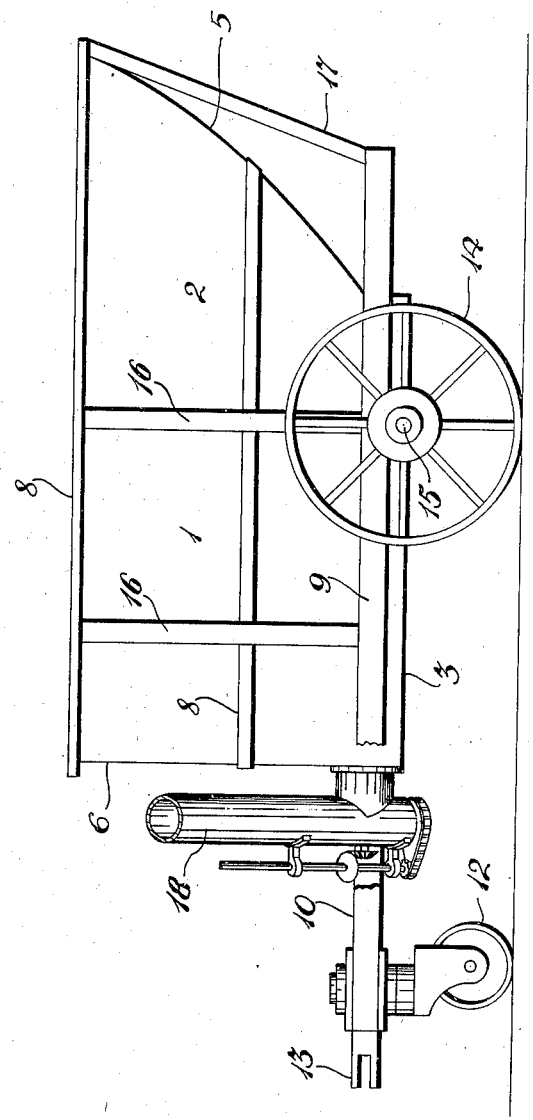
Figure 1 is a side elevation of my mobile grain hopper.

Considerable inconvenience is commonly experienced, and a considerable aggregate loss of valuable time during harvesting operations due to the combine-harvester hopper becoming filled to capacity with grain at a time when the haul-away trucks are absent. My invention seeks to remedy this situation and accordingly comprises the mobile grain hopper which is best exemplified in the accompanying Figure 1, and which is an inexpensive and light-weight structure mounted if desired on pneumatic tires, and capable of being hauled at least for short distances manually, or over longer distances in trains one behind another by a tractor or truck for example.

Proceeding now to describe my construction in detail, it will be seen that the same comprises a hopper or tank per se enumerated 1 having side walls 2 which incline downwardly towards each other in a curvilinear path to provide a trough 3 in which an auger 4 operates. The rear wall 5 inclines forwardly and downwardly towards the trough 3, front wall 6 being preferably vertical and provided at its base with an aperture 7 through which a shaft of the spiral conveyor 4 projects.

The above described hopper or tank is suitably reinforced by the structural members 8, and is supported on the rectangular horizontal framework 9 which includes the pair of diagonals 10 united by the fish plate 11 to which is secured a swivelling caster assembly 12 of conventional design and a draw-bar link 13. The horizontal framework 9 is supported upon a pair of ground wheels 14 via the stub axles 15. My hopper or tank is supported from the said framework by means of the vertical and diagonal members 16 and 17.

Adjacent the front wall 6 of my hopper or tank and upon the front side thereof is positioned a grain elevating auger including the cylindrical tube therefor collectively designated 18, and in the accompanying drawings, the same is shown inclined, or in other words, in the position into which it would be moved for the operation of conveying grain from my tank to an adjacent truck or other vehicle. Between the aperture 7 in the space of my front wall 6, and the lower end of auger 18 extends a short duct 19, the same being rotatable in aperture 7 and provided with the interior and exterior flanges 20 and 21 to facilitate such rotation.

Figure 2:
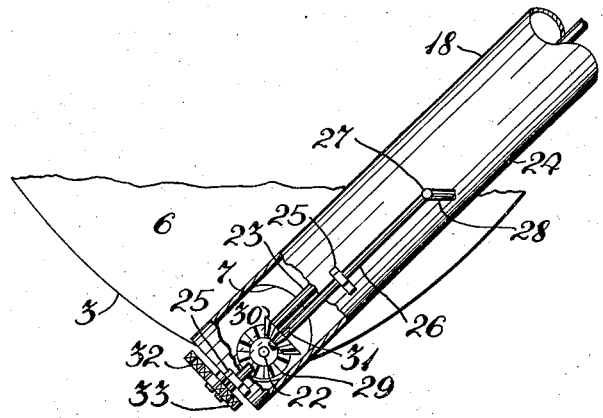
Figure 2 is a fragmentary frontal representation of the lower portion of my grain elevating auger and associated trough and front wall assembly.
Figure 3:
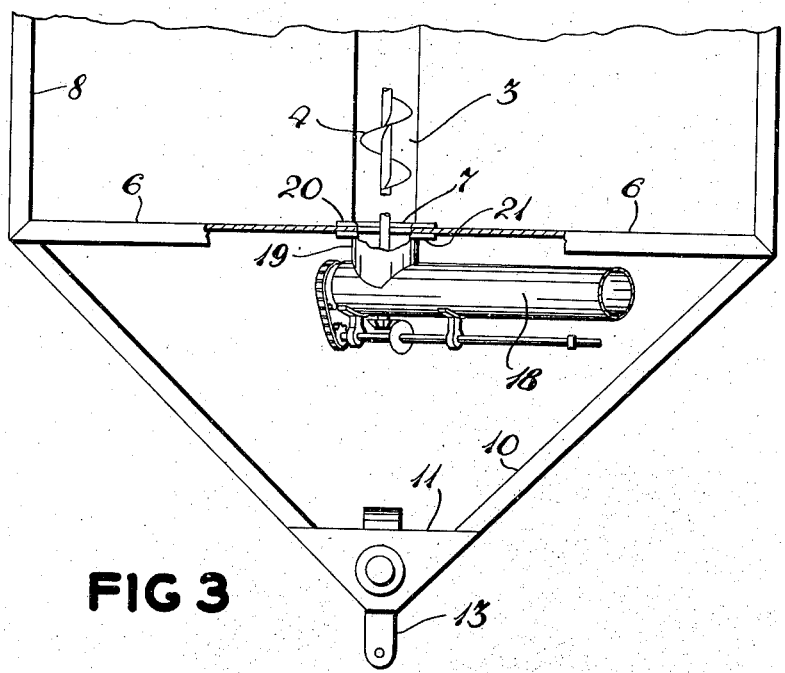
Figure 3 is a plan view of the forward part of my mobile grain hopper.

By reference to the accompanying Figure 2 it will be seen that shaft 22 of my horizontally disposed grain conveyor 4 is slightly offset with respect to the axis of aperture 7 in the base of my front wall 6. Such eccentricity is however vertically below the axis of the said aperture, the said shaft being so positioned to provide for the concentric positioning of auger shaft 23 within the tubular housing 24.

Secured to the said housing 24 is a pair of spaced bearings 25 within which rotates a shaft 26 universally connected at the point 27 to a flexible power take-off shaft 28. Upon the end of shaft 22 but external to, and on the front side of the tube 24 is a bevelled pinion 29 in mesh with a bevelled pinion 30 keyed for rotation to shaft 26 but movable endwise out of mesh therewith by means of the short key or splined portion 31.

At the external end of shaft 23 is a sprocket wheel 32, over which passes a sprocket chain meshing with a sprocket wheel 33 at the lower end of shaft 26, and from all the foregoing it will clearly be recognized that upon rotation of power take-off shaft 28, my horizontal grain conveyor 4, and my elevating auger 18 will be operated simultaneously to convey grain from my hopper per se into an adjacent truck or other receiver.

It is to be understood that my grain auger 18 is only intended to be swivelable between the vertical and approximately the angle of inclination illustrated, and in parallel with my front wall 6. Accordingly there will be no interception of shafts 22 and 23, but when my auger 18 is elevated into the vertical, it will first be necessary to unmesh the bevelled pinions 29 and 30 since the spatial relationships thereof will change as the auger is being rotated counter-clockwise with respect to Figure 2 in the vertical. There will however, be no difference in spatial relationships between the sprocket wheels 32 and 33.

From the foregoing it will be seen that I have provided peculiarly simplified and efficient means for (1) operating my horizontal conveyor and elevating auger simultaneously, (2) providing a wholly enclosed and swivelling connection between the interior of my hopper or tank and the interior of my auger 18, and (3) provided means whereby the foregoing may be accomplished without the necessity for gears rotating within the grain body, which of course would be highly detrimental to the grain.

Since many modifications can be made in the invention herein described and since the accompanying drawings have been prepared only to illustrate the relative arrangement and interaction of parts and not with regard to accuracy of dimensions for manufacturing purposes which in view of this disclosure I consider to entail merely mechanical skill together with the skill of the mechanical draftsman, and since many apparently widely different embodiments of this invention may be made within the scope of the accompanying claims without departing from the spirit and scope of the same it is intended that all matter contained in the accompanying specification shall be interpreted as illustrative only and not in a limiting sense and I desire only such limitations placed thereon as justice dictates.

What I claim as my invention is:

1. A mobile grain hopper for use particularly in connection with combine-harvesting, comprising in combination a hopper supported on a pair of wheels, said hopper being formed of a substantially vertical front wall, and a grain supporting surface including downwardly converging side walls, said front wall being apertured at the base thereof, a grain auger positioned in advance of and adjacent said front wall, a horizontal intercommunicating duct between said aperture and said auger being rotatable in a vertical plane substantially parallel to said front wall and about said duct, power take-off mechanism associated with said auger, and a ground support for the front end of said hopper to sustain the same in maximum grain holding position.

2. The device according to claim 1 which includes a spiral grain conveyor in the base of said hopper, said power take-off mechanism being operatively connected to said auger and said conveyor to actuate both simultaneously.

FREDERICK A. MULLIGAN.

REFERENCES CITED

The following references are of record in the file of this patent:

UNITED STATES PATENTS

| Number | Name | Date |
| --- | --- | --- |
| 1,933,873 | Osman | Nov. 7, 1933 |
| 2,052,169 | Darden | Aug. 25, 1936 |
| 2,127,580 | Bartholowsky | Aug. 23, 1938 |
| 2,219,533 | Ross | Oct. 29, 1940 |
| 2,296,014 | Benzel, Sr., et al. | Sept. 15, 1942 |
| 2,357,220 | Olson | Aug. 29, 1944 |
| 2,390,286 | Adams | Dec. 4, 1945 |